United States Patent [19]

Levy et al.

[11] 4,265,386
[45] May 5, 1981

[54] TORSIONAL FLUID DAMPER SYSTEM

[75] Inventors: Avner Levy, Irvine; Irving Karsh, Costa Mesa, both of Calif.

[73] Assignee: Bell & Howell Company, Chicago, Ill.

[21] Appl. No.: 54,371

[22] Filed: Jul. 2, 1979

[51] Int. Cl.³ ............................................. B65H 17/20
[52] U.S. Cl. ...................................... 226/190; 226/61
[58] Field of Search .................. 226/60, 61, 190, 194; 74/574; 242/75.3; 188/1 B, 266

[56] References Cited

U.S. PATENT DOCUMENTS

| | | | |
|---|---|---|---|
| 2,280,364 | 4/1942 | Atteslander | 74/574 |
| 2,819,069 | 1/1958 | Isom | 74/574 X |
| 3,130,936 | 4/1964 | Rochman | 242/75.3 |
| 3,904,001 | 9/1975 | Theyse et al. | 188/266 |
| 4,161,237 | 7/1979 | Uchida et al. | 188/1 B |

Primary Examiner—Leonard D. Christian
Attorney, Agent, or Firm—Benoit Law Corporation

[57] ABSTRACT

Disclosed are methods and apparatus for providing torsional fluid dampening in the kHz region with an inertial mass located in a rotary fluid container, and with a viscous fluid friction boundary layer located between that mass and a circumferential wall of the container. A supply of viscous liquid having a volume equal to the combined volumes of the boundary layer and inertial mass is provided. Both the inertial mass and the boundary layer are formed with that supply of viscous liquid in the fluid container which may then be rotated.

24 Claims, 4 Drawing Figures

TORSIONAL FLUID DAMPER SYSTEM

BACKGROUND OF THE INVENTION

1. Field of the Invention

The subject invention relates to torsional fluid dampers, methods and apparatus for providing torsional fluid dampening, methods and apparatus for dampening vibrations in elongate information carriers and methods and apparatus for advancing elongate information carriers, such as magnetic recording tapes.

2. Disclosure Statement

In a well-known torsional fluid damper, a flywheel or solid mass is mounted or contained in a tight casing so as to provide small clearances between the solid mass and adjacent wall portions of the casing. The viscous fluid couples the solid mass to the casing and a viscous fluid friction boundary layer is formed therein through rotation of the casing and inertia of the solid mass. By way of example, this type of damper is described in the Shock and Vibration Handbook, by Harris and Crede, pp. 38–30 etc. Reference may, for instance, be had to the Houdaille-type damper shown in FIG. 38.19 of that handbook.

A special type of viscous action damper is shown in U.S. Pat. No. 1,925,690, by L. A. Elmer, wherein fluid is pumped between cylinders and results in a force which, as in all viscous dampers, is proportional to the speed of a rotary container.

That prior-art damper is rather complex and expensive requiring a plurality of pumping cylinder or bellows pairs for its operation.

U.S. Pat. No. 2,280,364, by E. Atteslander, discloses a vibration dampening device in which the center of a hub is filled with lubricating oil through a duct in a supporting shaft. Oil ducts radiate from the center of the hub through arms of a base member to carry lubricating oil to plane contact surfaces of oscillatable members and to friction surfaces of planetary rollers. This prior-art vibration dampening device also is of a complex and expensive construction and shares further disadvantages with the initially mentioned basic torsional fluid damper, including the need for close tolerances which are difficult to establish and maintain.

A vibration dampener for a film advancing apparatus is shown in U.S. Pat. No. 2,819,069, by W. R. Isom. That dampener comprises a relatively rotatable outer flange and an inner cylindrical member. The inside of the cylindrical member contains a silicone oil which may pass through radial holes to an outer recess where it exerts a viscous drag on rotating roller elements. Again, close tolerances are required at the viscous boundary layer for an effective operation of that prior-art drag roller.

U.S. Pat. No. 3,286,109, by E. W. Madsen, discloses a step motor damped by a viscous fluid filling which provides viscous shear between the rotor and the stator of the step motor. This, of course, presupposes that there is in fact a rotor, which requirement necessarily limits the utility of that prior-art device.

U.S. Pat. No. 3,392,953, by J. L. Ciringione et al, discloses a vibration absorber having a cylindrical mass axially supported by a spring rod and immersed in a viscous medium and contained within a light-weight container of slightly larger size. That type of design practically limits the utility of such vibration absorbers to platform stabilization.

U.S. Pat. No. 3,641,839, by A. P. Greeley, discloses a viscous torsional vibration damper of the above mentioned Houdaille type wherein a flywheel or inertia weight has axially facing and circumferential working surfaces in parallel shear film spaced relation to complementary confronting working surfaces of a housing. As with other prior-art dampers of this type, a close tolerance has to be maintained between the flywheel or inertia weight working surfaces and complementary housing working surfaces, in order to establish and maintain efficient coupling shear films of viscous fluid in the spaces or gaps provided between the working surfaces. Special methods and means also have to be provided in these prior-art dampers to assure effective filling of such dampers with the requisite viscous damping media.

Prior-art fluid dampers having an internal solid mass of the above mentioned type are inherently restricted to the sub kHz range as far as oscillation or vibration dampening is concerned. Also, they are inherently incapable of achieving a sufficiently high Q for bandpass functions, whereby undesired vibration or oscillation effects could be selectively eliminated within narrow frequency bands.

SUMMARY OF THE INVENTION

It is a general object of this invention to overcome the disadvantages and satisfy the needs expressed or implicit in the disclosure statement herein contained.

It is a related object of this invention to provide improved torsional fluid damping methods and apparatus.

It is a germane object of this invention to provide improved methods and apparatus for torsional fluid dampening in the kHz (kilohertz) region.

It is also an object of this invention to provide improved methods and apparatus for dampening vibrations in elongate information carriers, such as magnetic recording tapes.

It is a related object of this invention to provide improved methods and apparatus for advancing an elongate information carrier, such as a magnetic recording tape.

Other objects will become apparent in the further course of this disclosure.

From one aspect thereof, the subject invention resides in a method of providing torsional fluid dampening in the kHz region with an inertial mass located in a rotary fluid container, and with a viscous fluid friction boundary layer located between that mass and a circumferential wall of the container. The invention according to this aspect resides, more specifically, in the improvement comprising in combination the steps of providing a supply of viscous liquid having a volume equal to the combined volumes of said boundary layer and said inertial mass, forming both said inertial mass and said boundary layer with said supply of viscous liquid in said fluid container as one continuous entity, and rotating said fluid container, boundary layer and inertial mass.

From another aspect thereof, the subject invention resides in a method of advancing an elongate information carrier with an information carrier drive and, more specifically, resides in the improvement comprising in combination the steps of dampening vibrations of the advancing information carrier in the kHz region with an inertial mass located in a rotary fluid container, and with a fluid friction boundary layer located between said mass and a circumferential wall of said container, by providing a supply of viscous liquid having a volume equal to the combined volumes of said boundary layer and said inertial mass, forming both said inertial mass and said boundary layer with said supply of viscous liquid in said fluid container as one continuous entity, advancing said information carrier with said carrier drive, and rotating said fluid container, boundary layer and inertial mass with said advancing information carrier.

From another aspect thereof, the subject invention resides in a torsional fluid damper of the inertial mass and viscous fluid friction boundary layer type having a frequency response in the kHz region. The invention according to this aspect resides, more specifically, in the improvement comprising, in combination, means for containing an inertial mass and viscous fluid friction boundary layer comprising a rotatable container having an internal space bounded by a circumferential wall, means for providing in said container an inertial mass and a viscous fluid friction boundary layer encompassing said inertial mass, comprising a viscous liquid extending through said internal space to said circumferential wall and forming both said inertial mass and said boundary layer as one continuous entity, and means for rotating said fluid container, boundary layer and inertial mass.

From another aspect thereof, the subject invention resides in apparatus for advancing an elongate information carrier with an information carrier drive and dampening vibrations of the advancing information carrier in the kHz region. The invention according to this aspect resides, more specifically, in the improvement comprising, in combination, means for contaning an inertial mass and viscous fluid friction boundary layer comprising a rotatable container having an internal space bounded by a circumferential wall, means for providing in said container an inertial mass and a viscous fluid friction boundary layer encompassing said inertial mass, comprising a viscous liquid extending through said internal space to said circumferential wall and forming both said inertial mass and said boundary layer as one continuous entity, means advancing said information carrier with said carrier drive, and means coupled to said advancing information carrier for rotating said fluid container, boundary layer and inertial mass with said advancing information carrier and dampening vibrations of said advancing information carrier in the kHz region with said viscous liquid inertial mass and boundary layer.

BRIEF DESCRIPTION OF THE DRAWINGS

The subject invention and its aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
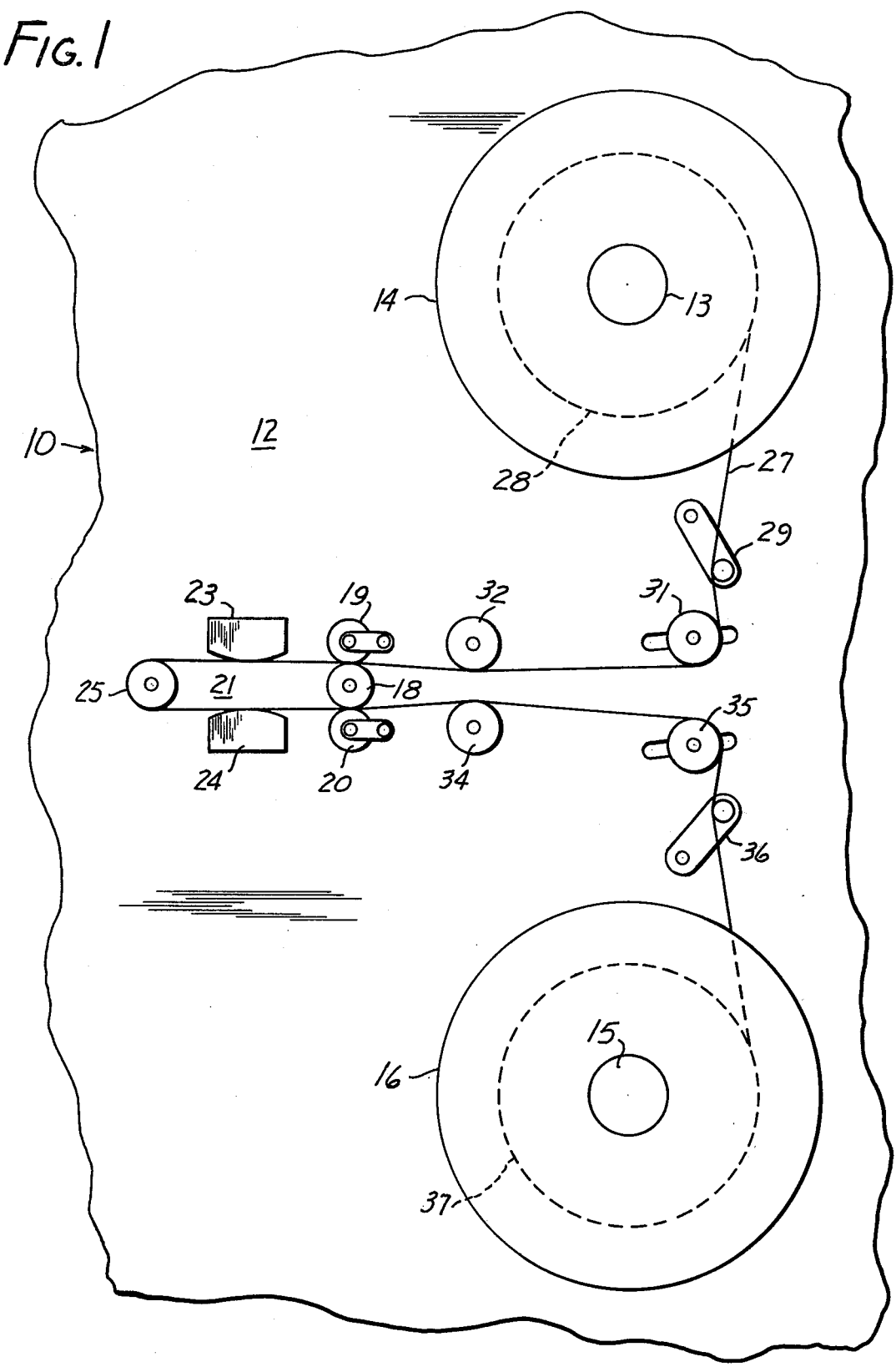
FIG. 1 is a plan view of a magnetic tape transport employing torsional fluid damping in accordance with a preferred embodiment of the subject invention.

Briefly, the magnetic tape transport 10 shown in FIG. 1 has a baseplate or deck 12 rotatably supporting a reel hub assembly 13 for releasably retaining a tape supply reel 14, and a reel hub assembly 15 for releasably retaining a tape takeup reel 16.

The deck also rotatably supports a tape capstan 18 which cooperates with a pair of pinch rollers 19 and 20 in transporting tape through a closed loop 21 past record and reproduce head stacks 23 and 24 via a turn-around roller 25 providing viscous fluid dampening according to a preferred embodiment of the subject invention.

In the operation of the tape transport, magnetic recording step 27 is advanced from a tape supply roll 28 on the reel 14 via a conventional tape break sensor 29 to a loop former roller 31 and thence to a tape edge guiding device 32 which precision guides the traveling tape 27 relative to the head stacks 23 and 24.

The tape capstan 18 may be driven by a conventional capstan drive with speed and servo loop control (not shown) in order to drive the tape through the closed loop 21 and to a further tape edge guiding device 34 and loop former roller 35. The tape is advanced from the device 35 via a conventional tape break sensor 36 to the takeup reel 16 to be wound into a tape roll 37 thereon.

Those skilled in the art of instrumentation tape recorders and similar equipment will recognize that the tape transport 10 will in practice be equipped with reel drives which may be of a conventional type in order to appropriately drive the reel 14 and 16 via the hub assemblies 13 and 15. Equipment of this type employs spring-loaded sensing rollers 31 and 35 for tape tension control. In particular, tape tension is set by the spring loading of the sensing rollers 31 and 35. Reel drive servos (not shown) adjust tape loop length to keep the sensing rollers 31 and 35 within the desired range of locations so that tape tension is controlled by sensing roller spring load.

In magnetic tape transports, including the illustrated transport 10, the tape constitutes a troublesome and largely intractable component. In particular, the tape, such as used in magnetic tape recorders, is a compliant medium with numerous variables. For instance, the tape has a high modulus of elasticity and a thin base that will easily stretch under tension. In the manner of a transmission line with uniform distribution of mass and compliance, the tape 27 is subject to various resonance effects. These include longitudinal resonance in a free tape span, transverse or low frequency resonance and a host of other resonance disturbances stemming from the fact that short spans of wider tapes in instrumentation recorders and other high-grade equipment act in effect as membranes with free edges, provoking a multitude of elusive vibration modes.

In practice, these vibration and resonance effects cause flutter which impairs not only the recording process and the resulting recording, but degrades also the reproduction of recordings.

Another troublesome source of flutter is the stick-slip friction which causes the tape to move with a jerky motion at very low speeds, where the static coefficient of friction is larger than the dynamic coefficient at capstans, heads and possible other tape-transport interfaces and which in effect excites resonance effects.

Further tension variation and similar disturbance effects are in a tape transport caused by such factors as changes in rotational speed of the tape drive, periodic variations from eccentric drive components, mechanical resonances in shafts, mechanical resonances in head mounts, tension disturbances from the tape reel system and external vibrations. In consequence, the use of servo systems, aiming primarily at a reduction of a ratio of flutter to circular frequency called "time base error," has become routine in instrumentation tape recorders, video tape recorders and other high-grade recording/playback machines in which the subject invention may be implemented.

In an effort to overcome these detrimental effects, dampened idler rollers have sometimes been employed in magnetic tape transports and other apparatus for advancing elongate information carriers.

As to prior-art solutions of this type it may, however, be generally noted that dampened idlers, while addressing themselves to a natural desire to reduce flutter generating tape vibration, exact the often exorbitant price of servo bandwidth reduction. Also, torsional fluid dampers of the above mentioned prior-art type tend to introduce disturbances of their own, frequently because of practically unattainable tolerance requirements. For instance, the central flywheel or inertial weight in conventional torsional fluid dampers must fit the inside diameter of the fluid casing very closely so that the resulting fluid film can centralize the solid mass while the casing is rotating and so that noticeable unbalance is avoided. This close fit tolerance is difficult and expensive to attain and maintain in practice and severely restricts the choice of viscous fluids, since the clearance and the desired viscosity are inversely related.

Figure 2:
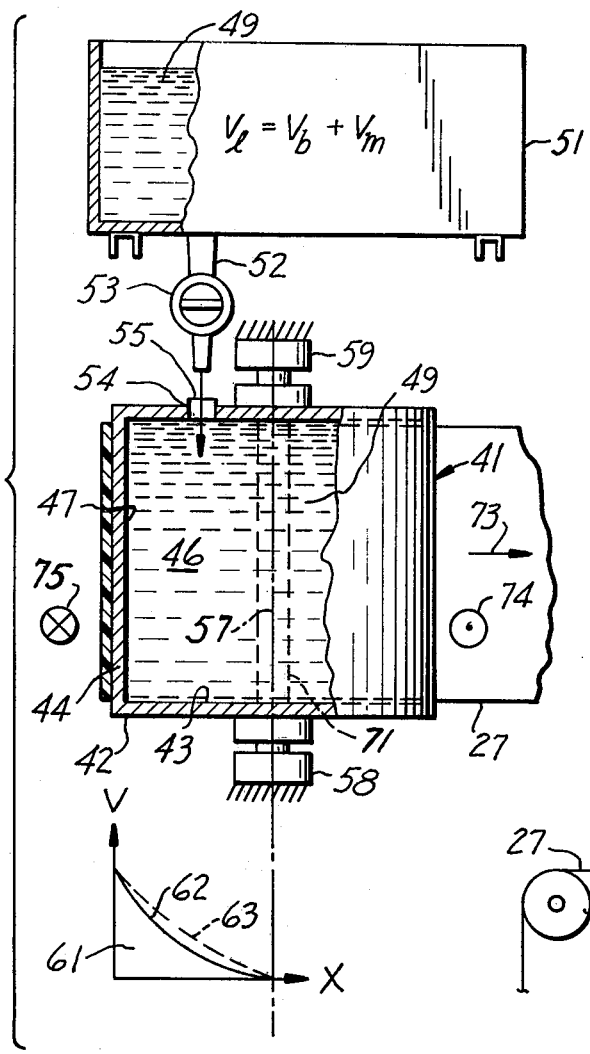
FIG. 2 is a side view, partially in section, of a torsional fluid damper according to a preferred embodiment of the subject invention, together with a diagrammatic showing of a method for making such a fluid damper according to a preferred method of the subject invention.

In accordance, with a preferred embodiment of the subject invention, a torsional fluid damper of the type shown in FIG. 2, is employed as or at the turnaround roller 25 in the tape transport 10 of FIG. 1.

As shown in FIG. 2, a torsional fluid damper 41 according to a preferred embodiment of the subject invention has means for containing an inertial mass and viscous fluid friction boundary layer, comprising a rotatable container 42 having an internal space 43 bounded by a circumferential wall 44. As shown in FIG. 2, the container 42 is thin walled for low inertia.

As also shown in FIG. 2, the container 42 is preferably hollow-cylindrical, enclosing a cylindrical internal space 43.

The torsional fluid damper 41 contains a central inertial mass 46 and provides a viscous fluid friction boundary layer 47 which encompasses the inertial mass 46 at the circumferential wall 44 upon acceleration or deceleration of the container 42.

As illustrated in the upper part of FIG. 2, a method according to a preferred embodiment of the subject invention provides a supply of viscous liquid 49 having a volume $V_1$ equal to the combined volumes $V_b$ and $V_m$ of the boundary layer 47 and inertial mass 46, respectively. In this respect, a container 51 having at least the same volume as the hollow container 41 may be provided for temporarily holding the viscous liquid supply 49. The container 51 has an outlet or spigot 52 normally blocked by an on-off valve 53. The lower end of the spigot 52 fits into an opening 54 in the container 42. In this respect, the opening 54 may be closed by a plug 55 or similar closure device, but is, of course, open when the viscous liquid 49 is introduced into the hollow space within the container 42.

To this end, the valve 53 is opened so that the viscous liquid supply 49 may flow from the container 51 via spigot 52, open valve 53 and opening 54 from the container 51 into the container 42. In this manner, the method according to the preferred embodiment of the subject invention illustrated in FIG. 2 forms both the internal mass 46 and the boundary layer 47 with the supply of viscous liquid 49 in the fluid container 42 as one continuous entity, as seen in FIG. 2.

To facilitate the insertion of the viscous liquid supply 49 from the container 51 into the container 42, a second opening (not shown) may be provided to facilitate an escape of air from the internal space 43. Upon transfer of the viscous liquid supply 49 from the container 51 to the container 42, the aperture 54 is sealed by a plug 55 or other sealing means. The same applies to any air escape aperture that may be present in the container 42.

It is thus seen that according to the aspect of the subject invention illustrated in FIG. 2., the viscous liquid supply or charge 49 in the rotary container 42 not only provides the viscous fluid friction boundary layer 47 at the inside of the circumferential wall 44, but also the inertial mass 46 which in comparable prior-art torsional fluid dampers was provided by a flywheel or similar solid structure. Contrary to long-established prior-art teaching, it has been found that torsional fluid dampers according to the subject invention work well without the traditional internal flywheel or solid weight, and actually work better in many respects. For one thing, since both the inertial mass 46 and boundary layer 47 are formed in the container or casing 42 with the same viscous liquid charge 49, the above mentioned prior-art tolerance problems and their resulting effects are avoided. In addition, torsional fluid dampers according to the aspect of the subject invention shown in FIG. 2 are capable of oscillation or vibration dampening in the kHz region, whereas comparable prior-art torsional fluid dampers were inherently restricted to the sub kHz range, rendering them useless for many applications where undesired high-frequency vibrations occur.

In practice, it is not essential that the entire volume of the space 43 be filled with damping liquid 49. Rather, a small volume of a compressible medium, such as air or another gas, may be present in the space 43 to allow for differential expansion of the container 42 and its viscous charge. The degree of the viscous liquid fill in the container 42 also provides a way of tuning the damper 41 as desired.

As further shown in FIG. 2, the fluid container 42 is rotated about an axis 57 which extends through the viscous liquid in such fluid container. To this end, rotary mounting devices including bearings 58 and 59 are connected to the fluid container 42 at the axis of rotation 57. In practice, the bearing 58 may be attached to the baseplate 12 of the tape transport. Where this alone would not provide the desired stability, a bearing of the type of bearing 59 may be attached to a mounting post (not shown) which, in turn, rises from the baseplate 12 of the tape transport shown in FIG. 1.

As also shown in FIG. 2, the viscous liquid in the rotary container 42 extends through the internal space 43 to the circumferential wall 44 to form both the inertial mass at and about the axis 57 and the boundary layer 47 about the inertial mass 46 at the inside of the circumferential wall 44 of the rotary container 42.

The graph 61 at the bottom of FIG. 2 illustrates the operation of the torsional fluid damper 41 according to the currently discussed aspect of the subject invention. In particular, the graph 61 illustrates instantaneous liquid velocity or perturbation v as a function of distance x from a point on the inside surface of the circumferential 44.

When rotation of the container 42 is started, the perturbation or velocity of the viscous liquid initially remains zero at the axis of rotation 57 while attaining a maximum at the circumferential wall 44.

Viscous liquid mass 46 of the torsional fluid damper 41 according to the subject invention thus functions in the manner of the above mentioned flywheel or solid inertial mass of prior-art torsional fluid dampers. This functional correspondence also obtains in the case of acceleration and deceleration of the rotating container 42, whereby the liquid central mass 46 resists change through inertia but is coupled by the boundary layer 46 to the circumferential wall 44 of the casing. Simultaneously, the viscous liquid charge in the container 42 forms the requisite viscous fluid or liquid friction boundary layer 47 in addition to the liquid inertia mass 46.

Operation of the torsional fluid damper 41 may be realized in different frequency ranges by changing the dimensions of the fluid container 42 and the volume of the liquid charge. As also partially illustrated by different curves 62 and 63 in the graph 61, different operational characteristics of the torsional fluid damper 41 may be realized by selecting different viscous liquids for different applications. There is thus no strict limitation on the type of liquid as such that may be used as the charge in the container 42. For instance, various lubricating oils and silicone oils are suitable as viscous liquids in the damper 41. Silicone oils are typically preferred because of their advantageous stability throughout wide temperature ranges and their availability at various viscosity ratings. In this respect, while the drawings illustrate the dampers with containers that are completely filled by the viscous liquid charge, it should be understood that a small air or gas space may be provided for thermal expansion.

Preferably, however, the internal space 43 and viscous liquid charge contained therein extend throughout the container in the embodiment shown in FIG. 2.

Figure 3:
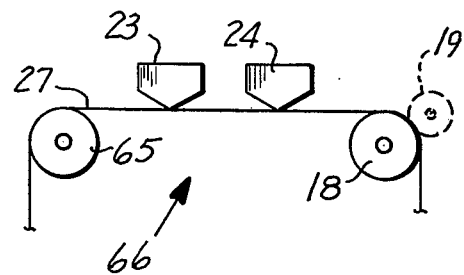
FIG. 3 is a diagrammatic showing of essential parts of a further tape transport employing a torsional fluid damper according to another embodiment of the subject invention.

Torsional fluid vibration damping according to the subject invention is not limited to any particular field of application. However, according to preferred embodiments thereof, the torsional fluid dampening methods and apparatus according to the subject invention are most advantageously employed in transports of magnetic tape, motion picture film or other information carriers. For instance, the torsional fluid dampers according to the subject invention may be employed as drag rollers or mechanical filters in the sound section of motion picture projectors. The above mentioned U.S. Pat. Nos. 1,925,690 and 2,819,069, showing torsional fluid dampers for imposing uniform velocity on motion picture film at sound pickup or transducing apparatus in motion picture projectors or cameras, are herewith incorporated by reference herein. By way of further example, the torsional fluid damper 41 may, as already indicated above, be employed as the turnaround roller 25 in the tape transport 10. By way of further example, and as illustrated in FIG. 3, the torsional fluid damper 41 may be employed as an inertia roller 65 in a tape transport 66 wherein a capstan 18, if necessary with the aid of a pinch roller 19, advances magnetic recording tape 27 from a tape supply (not shown) via torsional fluid dampening idler 65 past recording and playback heads or head stacks 23 and 24.

Figure 4:
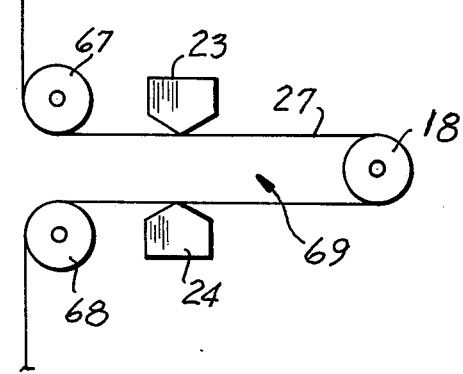
FIG. 4 is a diagrammatic showing of essential parts of yet another tape transport employing torsional fluid dampers according to yet another embodiment of the subject invention.

Limitations imposed by pinch rollers have led to the development of pure friction drives known, for instance, as "capstan wrapping" wherein the tape, as shown in FIG. 4 extends around part of the capstan 18 at a sufficient wrap angle to generate the requisite traction force on the tape 27. In particular, torsional fluid dampers 41 may be employed as inertia rollers or idlers 67 and 68 in the type of tape transport 69 shown in FIG. 4, in order to form with the aid of the capstan 18 a tape loop wherein the magnetic tape travels past the recording heads or head stacks 23 and 24 and is subjected to vibration dampening by the rollers 67 and 68.

As shown by dotted lines in FIG. 2, a shaft 71 may extend through the container 42. This viscous liquid container 42 may be rotated about that shaft. If such a shaft 71 is employed, the viscous liquid 49 extends radially from such shaft 71 to the circumferential wall 44 of the container. The shaft 71 may, for instance, be stationary and extend along the axis 57 in FIG. 2, whereby the viscous liquid charge 49 forms the above mentioned liquid inertia mass 46 at and around such axial shaft and the adjacent fluid friction boundary layer 47 at the rotating circumferential wall 44.

Recapitulating at this point the description of FIGS. 1 to 4, it is seen that the method and apparatus of the invention therein shown dampen vibrations of the advancing information carrier 27, typically in the kHz region, with an inertial mass 46 located in a rotary fluid container 42, and with a fluid friction boundary layer 47 located between that mass 46 and the circumferential wall 44 of the container. The subject invention according to its aspects illustrated in FIG. 4 provides for this purpose a supply of viscous liquid 49 having a volume equal to the combined volumes of the boundary layer 47 and inertial mass 46, and forms both such inertial mass and boundary layer 46 and 47 with that supply 49 of viscous liquid in the fluid container 42.

As shown in FIGS. 1, 3 and 4, the information carrier 27 is then advanced with the carrier drive including a capstan 18, and the fluid container 42 is rotated with the advancing information carrier 27. Preferably, the fluid container 42 as shown in FIG. 2 is rotated with the advancing information carrier 27 about an axis 57 extending through the viscous liquid 49 in the fluid container 42. As indicated above, the viscous liquid 49 extends preferably throughout the container 42. As apparent from FIGS. 1 to 4 and their above descriptions, the information carrier 27 is preferably advanced in contact with the circumferential wall 44 of the container 42. For instance, the information carrier 27 may be advanced in the direction of arrow 73 in FIG. 2, whereby the liquid container 42 is rotated in a sense indicated by arrow symbols 74 and 75.

As further shown in FIG. 1 at 25, the information carrier 27 may be advanced in a loop 21 extending through a wrap angle in contact with the circumferential wall of the container (see 44 in FIG. 2). In particular, information carrier 27 may be advanced in a closed loop 21 formed with the rotary container having the circumferential wall 44, and with a capstan 18 included in an information carrier drive.

As also shown in FIGS. 1 and 4, the information carrier 27 may be advanced in a loop having a bight portion extending in contact with the circumferential wall of the container (see 42 and 44 in FIG. 2).

In all these embodiments, vibrations of the advancing information carrier 27 are dampened in the kHz region with the viscous liquid inertial mass 46 and boundary layer 47. As an added feature, the subject invention provides torsional fluid dampers which are controllable by suitable dimensioning and selection of the viscous liquid charge so as to provide dampening frequency responses at different desired frequency regions capable of extending into the supersonic range. Similarly, the design flexibility provided by the subject invention enables the construction of bandpass dampers which selectively eliminate undesired vibration or oscillation effects within narrow frequency bands.

Moreover, the subject extensive disclosure will suggest or render apparent to those skilled in the art various modifications and variations within the spirit and scope of the subject invention.

We claim:

1. In a method of providing torsional fluid dampening in the kHz region with an inertial mass located in a rotary fluid container, and with a viscous fluid friction boundary layer located between said mass and a circumferential wall of said container, the improvement comprising in combination the steps of:
    providing a supply of viscous liquid having a volume equal to the combined volumes of said boundary layer and said inertial mass;
    forming both said inertial mass and said boundary layer with said supply of viscous liquid in said fluid container as one continuous entity; and
    rotating said fluid container, boundary layer and inertial mass.

2. A method as claimed in claim 1, wherein:
    said fluid container is rotated about an axis extending through said viscous liquid in said fluid container.

3. A method as claimed in claim 1, wherein:
    said viscous liquid is extended throughout said container.

4. A method as claimed in claim 1, wherein:
    said container is rotated about a relatively stationary shaft extending through said container; and
    said viscous liquid extends radially from said shaft to said circumferential wall of said container.

5. In a method of advancing an elongate information carrier with an information carrier drive, the improvement comprising in combination the steps of:
    dampening vibrations of the advancing information carrier in the kHz region with an inertial mass located in a rotary fluid container, and with a fluid friction boundary layer located between said mass and a circumferential wall of said container, by providing a supply of viscous liquid having a volume equal to the combined volumes of said boundary layer and said inertial mass, forming both said inertial mass and said boundary layer with said supply of viscous liquid in said fluid container as one continuous entity;
    advancing said information carrier with said carrier drive; and
    rotating said fluid container, boundary layer and inertial mass with said advancing information carrier.

6. A method as claimed in claim 5, wherein:
    said fluid container is rotated with said advancing information carrier about an axis extending through said viscous liquid in said fluid container.

7. A method as claimed in claim 5, wherein:
    said viscous liquid extends throughout said container.

8. A method as claimed in claim 5, wherein:
    said container is rotated with said advancing information carrier about a relatively stationary shaft extending through said container; and
    said viscous liquid extends radially from said shaft to said circumferential wall of said container.

9. A method as claimed in claim 5, 6, 7 or 8, wherein:
    said information carrier is advanced in contact with said circumferential wall of said container.

10. A method as claimed in claim 5, 6, 7 or 8, wherein:
    said information carrier is advanced in a loop extending through a wrap angle in contact with said circumferential wall of said container.

11. A method as claimed in claim 5, 6, 7 or 8, wherein:
    said information carrier is advanced in a closed loop formed with said rotary container having said circumferential wall, and with a capstan included in said information carrier drive.

12. A method as claimed in claim 5, 6, 7 or 8, wherein:
    said information carrier is advanced in a loop having a bight portion extending in contact with said circumferential wall of said container.

13. In a torsional fluid damper of the inertial mass and viscous fluid friction boundary layer type having a frequency response in the kHz region, the improvement comprising in combination:
    means for containing an inertial mass and viscous fluid friction boundary layer comprising a rotatable container having an internal space bounded by a circumferential wall;
    means for providing in said container an inertial mass and a viscous fluid friction boundary layer encompassing said inertial mass, comprising a viscous liquid extending through said internal space to said circumferential wall and forming both said inertial mass and said boundary layer as one continuous entity; and
    means for rotating said fluid container, boundary layer and inertial mass.

14. A damper as claimed in claim 13, wherein:
    said damper includes means connected to said container for mounting said container for rotation about an axis extending through said viscous liquid in said space.

15. A damper as claimed in claim 13, wherein:
    said internal space and viscous liquid extend throughout said container.

16. A damper as claimed in claim 13, wherein:
    said damper includes a shaft extending through said container and means for mounting said container for rotation about said shaft; and
    said viscous liquid extends radially from said shaft to said circumferential wall of said container.

17. In apparatus for advancing an elongate information carrier with an information carrier drive and dampening vibrations of said advancing information carrier in the kHz region, the improvement comprising in combination:
    means for containing an inertial mass and viscous fluid friction boundary layer comprising a rotatable container having an internal space bounded by a circumferential wall;

means for providing in said container an inertial mass and a viscous fluid friction boundary layer encompassing said inertial mass, comprising a viscous liquid extending through said internal space to said circumferential wall and forming both said inertial mass and said boundary layer as one continuous entity;

means for advancing said information carrier with said carrier drive; and means coupled to said advancing information carrier for rotating said fluid container, boundary layer and inertial mass with said advancing information carrier and dampening vibrations of said advancing information carrier in the kHz region with said viscous liquid inertial mass and boundary layer.

18. Apparatus as claimed in claim 17, wherein:
said damper includes means connected to said container for mounting said container for rotation with said advancing information carrier about an axis extending through said viscous liquid in said space.

19. Apparatus as claimed in claim 17, wherein:
said internal space and viscous liquid extend throughout said container.

20. Apparatus as claimed in claim 17, wherein:
said damper includes a shaft extending through said container and means for mounting said container for rotation about said shaft with said advancing information carrier; and
said viscous liquid extends radially from said shaft to said circumferential wall of said container.

21. Apparatus as claimed in claim 17, wherein:
said means for rotating said fluid container include means coupled to said information carrier for advancing said information carrier in contact with said circumferential wall of said container.

22. Apparatus as claimed in claim 17, wherein:
said means for rotating said fluid container include means coupled to said information carrier for advancing said information carrier in a loop extending through a wrap angle in contact with said circumferential wall of said container.

23. Apparatus as claimed in claim 17, wherein:
said information carrier drive includes a capstan; and
said apparatus includes means, including said capstan and said circumferential wall of said container, for forming said information carrier into a closed loop.

24. Apparatus as claimed in claim 17, 18, 19 or 20, wherein:
said information carrier drive includes means for advancing said information carrier in a loop having a bight portion extending in contact with said circumferential wall of said container.

* * * * *